United States Patent [19]
Mendoza

[11] Patent Number: 5,484,547
[45] Date of Patent: Jan. 16, 1996

[54] LOW TEMPERATURE HEAT TRANSFER FLUIDS

[75] Inventor: Abel Mendoza, Midland, Mich.

[73] Assignee: The Dow Chemical Company, Midland, Mich.

[21] Appl. No.: 178,592

[22] Filed: Jan. 7, 1994

Related U.S. Application Data

[63] Continuation of Ser. No. 861,056, Apr. 1, 1992, abandoned.

[51] Int. Cl.$^6$ ..................................................... C09K 15/00
[52] U.S. Cl. .............................. 252/73; 252/79; 252/54.6; 252/51.5 B; 252/48.6
[58] Field of Search .............................. 252/73, 75, 54.6, 252/51.5 R, 48.6

[56] References Cited

U.S. PATENT DOCUMENTS

| | | | |
|---|---|---|---|
| 3,607,756 | 9/1971 | Phillips | 252/73 |
| 3,809,152 | 5/1974 | Boehmer | 252/73 |
| 4,418,231 | 11/1983 | Pamer | 252/364 |
| 4,448,702 | 3/1984 | Kaes | 252/70 |
| 5,064,551 | 11/1991 | Smith | 252/70 |
| 5,093,018 | 4/1992 | Walsh | 252/47.5 |
| 5,118,434 | 6/1992 | Meyer et al. | 252/70 |

OTHER PUBLICATIONS

Sullivan, *Solar Heat Transfer Fluids,* (Dec., 1980) Solar Age, psg, 33–36.

Primary Examiner—Paul Lieberman
Assistant Examiner—Necholus Ogden

[57] ABSTRACT

A heat transfer fluid containing a glycol component and a second component selected from the group consisting of 1,3-dioxolane, 2,2-dimethyl-1,3-dioxolane, glycerol formal, solketal, and 1,3-dioxanes is disclosed. The heat transfer fluid can also optionally contain corrosion inhibitors, $C_{1-3}$ alcohols, urea, imidazole or alkali metal salts. These fluids are useful as low temperature heat transfer fluids, are stable to aqueous buffers and may be used neat or as aqueous solutions over a wide range of concentrations.

7 Claims, No Drawings

LOW TEMPERATURE HEAT TRANSFER FLUIDS

CROSS-REFERENCE TO RELATED APPLICATION

This is a continuation of application Ser. No. 07/861,056, filed Apr. 1, 1992 now abandoned.

BACKGROUND OF THE INVENTION

The present invention is related to low temperature heat transfer fluids.

Heat transfer fluids for use at low temperatures have frequently been based on ethylene glycol due to its high boiling point, its miscibility with water and its moderate flammability and explosive properties. However, in recent years some questions have been raised concerning its toxicity. This has led to investigation of heat transfer fluids based on substances other than ethylene glycol.

One approach to avoiding the use of ethylene glycol is to simply substitute propylene glycol for ethylene glycol. However, since propylene glycol has higher viscosity than ethylene glycol, fluids prepared in this way are not entirely acceptable.

U.S. Pat. No. 3,607,756, issued to Phillips on Sep. 21, 1971 teaches that a heat transfer fluid comprising propylene glycol, propylene carbonate and water is useful for certain heat transfer applications. However, there remains a need for effective heat transfer fluids possessing low toxicity.

SUMMARY OF THE INVENTION

The present invention is directed to heat transfer fluids consisting essentially of
(1) a glycol component selected from the group consisting of propylene glycol, glycerol, 1,3-butanediol, diethylene glycol and triethylene glycol;
(2) a second component selected from the group consisting of 1,3-dioxolanes, 1,3-dioxanes, and 1,2-diethers;
(3) optionally, a third component selected from the group consisting of urea, imidazole and alkali metal salts;
(4) optionally, a $C_{1-3}$ alcohol; and
(5) optionally, corrosion inhibitors.

These fluids are useful as low temperature heat transfer fluids and deicing fluids, are stable to aqueous buffers and may be used neat or as aqueous solutions over a wide range of concentrations.

DETAILED DESCRIPTION OF THE ILLUSTRATIVE EMBODIMENTS

The first component of the heat transfer fluid of the present invention is propylene glycol, glycerol, 1,3-butanediol, diethylene glycol or triethylene glycol. Substituted propylene glycol, substituted glycerol, substituted 1,3-butanediol, substituted diethylene glycol or substituted triethylene glycol may also be used as long as the substituents do not interfere with the properties of the heat transfer fluid. Examples of substituents include alkyl, esters and acetal groups.

The first component is preferably propylene glycol, glycerol or 1,3-butanediol and is more preferably propylene glycol or glycerol. It is most preferred that the first component is propylene glycol.

The amount of the first component useful in the heat transfer fluid of the present invention is preferably from about 30 to about 60 weight percent based on the weight of the fluid, prior to the addition of any water.

The second component of the heat transfer fluid of the present invention is selected from the group consisting of 1,3-dioxolane, substituted 1,3-dioxolane, 1,3-dioxane, substituted 1,3-dioxane and 1,2-diethers and esters. Examples of the second component include ethylene carbonate, propylene carbonate, 1,2-dimethoxypropane, glycerol formal, diethylene glycol ethyl ether acetate, propylene glycol acetate and propylene glycol methyl ester acetate. The dioxanes and dioxolanes are preferred and the 1,3-dioxolanes are more preferred.

The amount of the second component useful in the heat transfer fluid of the present invention is preferably from about 10 to about 60 weight percent based on the weight of the fluid prior to the addition of any water. More preferred ratios are from 20 to about 50 weight percent.

The third component, which is optionally used in the present invention is selected from the group consisting of urea, imidazole, N,N-dimethylformamide or alkali metal salts. Examples of useful alkali metal salts include sodium nitrite, sodium nitrate and potassium nitrite. It is preferred to use urea. The amount of the third component useful in the present invention ranges from zero up to about 50 weight percent, based on the weight of the fluid prior to the addition of any water. It is preferred that when the third component is used, it is used to replace a portion of the second component.

The heat transfer fluids of the present invention may also include a $C_{1-3}$ alcohol. The alcohols useful in the present include methanol, ethanol and propanol which may be substituted with fluorine. When the alcohol is used, it is used in amounts up to 30 weight percent, based on the weight of the fluid prior to the addition of any water. The upper limit is more preferably about 20 weight percent.

The fluids may also comprise standard corrosion inhibitors such as organic and inorganic bases, buffers, borates, silicates, nitrites, nitrates, molybdates, tungstates and triazoles.

The heat transfer fluid may optionally be diluted with water either when prepared or prior to use. The diluted heat transfer fluid comprises from 10 to 90 weight percent water with the balance being active components. More preferably, the diluted heat transfer fluid comprises from 40 to 60 weight percent water with the balance being active components.

EXAMPLE 1

Compositions containing the glycol component, the second component, and optionally the third component, as shown in Table I below, were prepared by weighing the appropriate amounts of each component and dissolving in water. Viscosities were measured using a Brookfield Digital Viscometer Model LVTDV-IICP.

TABLE I

| Composition | Wt. % | Viscosity (cP) | | |
|---|---|---|---|---|
| | | 5° C. | 10° C. | 20° C. |
| No. 1 | | 5.2 | 4.3 | 3.0 |
| PG[1] | 30 | | | |
| 1,3-dioxolane | 20 | | | |

TABLE I-continued

| Composition | Wt. % | Viscosity (cP) 5° C. | 10° C. | 20° C. |
|---|---|---|---|---|
| Water | 50 | | | |
| No. 2 | | 6.6 | 5.6 | 3.8 |
| PG¹ | 20 | | | |
| Glycerol formal | 30 | | | |
| Water | 50 | | | |
| No. 3 | | 9.1 | 7.4 | 4.6 |
| PG¹ | 30 | | | |
| 1,2-dimethoxy propane | 20 | | | |
| Water | 50 | | | |
| No. 4 | | 10.8 | 8.5 | 5.4 |
| PG¹ | 30 | | | |
| Solketal | 20 | | | |
| Water | 50 | | | |
| No. 5 | | 7.6 | 6.2 | 4.2 |
| PG¹ | 30 | | | |
| 2,2-dimethyl-1,3-dioxolane | 20 | | | |
| Water | 50 | | | |
| No. 6 | | 9.0 | 7.5 | 5.4 |
| PG¹ | 20 | | | |
| TEG-dimethyl ether² | 30 | | | |
| Water | 50 | | | |
| No. 7 | | 5.9 | 4.9 | 3.3 |
| PG¹ | 25 | | | |
| 1,3-dioxane | 25 | | | |
| Water | 50 | | | |
| No. 8 | | 4.3 | 3.6 | 2.4 |
| Glycerol | 25 | | | |
| 1,3-dioxolane | 25 | | | |
| Water | 50 | | | |
| No. 9 | | 6.9 | 5.7 | 4.1 |
| Glycerol | 25 | | | |
| Glycerol formal | 25 | | | |
| Water | 50 | | | |
| No. 10 | | 5.9 | 4.9 | 3.4 |
| Glycerol | 25 | | | |
| 1,3-dioxane | 25 | | | |
| Water | 50 | | | |
| No. 11 | | 9.4 | 7.4 | 4.4 |
| Glycerol | 25 | | | |
| 1,2-dimethoxypropane | 25 | | | |
| Water | 50 | | | |
| No. 12 | | 4.0 | 3.3 | 2.4 |
| Diethylene glycol | 25 | | | |
| 1,3-dioxolane | 25 | | | |
| Water | 50 | | | |
| No. 13 | | 6.4 | 5.3 | 3.8 |
| Diethylene glycol | 25 | | | |
| Glycerol formal | 25 | | | |
| Water | 50 | | | |
| No. 14 | | 5.6 | 4.4 | 3.1 |
| Diethylene glycol | 25 | | | |
| 1,3-dioxane | 25 | | | |
| Water | 50 | | | |
| No. 15 | | 8.0 | 6.1 | 4.2 |
| Diethylene glycol | 25 | | | |
| 1,2-dimethoxy propane | 25 | | | |
| Water | 50 | | | |
| No. 16 | | 6.6 | 5.2 | 3.8 |
| Diethylene glycol | 30 | | | |
| 2,2-dimethyl-1,3-dioxolane | 20 | | | |
| Water | 50 | | | |
| No. 17 | | 4.3 | 3.6 | 2.6 |
| Triethylene glycol | 25 | | | |
| 1,3-dioxolane | 25 | | | |
| Water | 50 | | | |
| No. 18 | | 7.0 | 5.9 | 4.1 |
| Triethylene glycol | 25 | | | |
| Glycerol formal | 25 | | | |
| Water | 50 | | | |
| No. 19 | | 7.0 | 5.8 | 4.0 |
| TEG-monomethyl ether³ | 25 | | | |
| Glycerol formal | 25 | | | |
| Water | 50 | | | |
| No. 20 | | 4.9 | 4.0 | 2.9 |
| 1,3-butanediol | 25 | | | |
| 1,3-dioxolane | 25 | | | |
| Water | 50 | | | |
| No. 21 | | 8.5 | 6.8 | 4.6 |
| 1,3-butanediol | 25 | | | |
| Glycerol formal | 25 | | | |
| Water | 50 | | | |
| No. 22 | | 6.0 | 4.8 | 3.6 |
| PG¹ | 30 | | | |
| 1,3-dioxolane | 10 | | | |
| Urea | 10 | | | |
| Water | 50 | | | |
| No. 23 | | 6.5 | 5.3 | 4.2 |
| PG¹ | 30 | | | |
| Glycerol formal | 10 | | | |
| Urea | 10 | | | |
| Water | 50 | | | |
| No. 24 | | 7.2 | 5.4 | 4.2 |
| PG¹ | 30 | | | |
| 4-methyl-1,3-dioxane | 10 | | | |
| Urea | 10 | | | |
| Water | 50 | | | |
| No. 25 | | 6.9 | 5.7 | 3.8 |
| PG¹ | 30 | | | |
| 4-methyl-1,3-dioxane | 10 | | | |
| Imidazole | 10 | | | |
| Water | 50 | | | |
| No. 26 | | 6.4 | 4.4 | 3.3 |
| PG¹ | 30 | | | |
| 1,3-dioxolane | 10 | | | |
| Imidazole | 10 | | | |
| Water | 50 | | | |
| No. 27 | | 7.2 | 5.8 | 3.7 |
| PG¹ | 30 | | | |
| Glycerol formal | 10 | | | |
| Methanol | 10 | | | |
| Water | 50 | | | |
| No. 28 | | 6.6 | 4.9 | 3.4 |
| PG¹ | 30 | | | |
| 1,3-dioxolane | 10 | | | |
| Ethanol | 10 | | | |
| Water | 50 | | | |
| No. 29 | | 7.2 | 5.7 | 3.8 |
| PG¹ | 30 | | | |
| 1,3-dioxolane | 10 | | | |
| Pentafluoro-1-propanol | 10 | | | |
| Water | 50 | | | |
| No. 30 | | 6.2 | 5.1 | 3.4 |
| PG¹ | 30 | | | |
| 1,3-dioxane | 10 | | | |
| KNO₂ | 10 | | | |
| Water | 50 | | | |
| No. 31 | | 6.2 | 5.6 | 3.6 |
| Glycerol | 30 | | | |
| Glycerol formal | 10 | | | |
| Urea | 10 | | | |
| Water | 50 | | | |
| No. 32 | | 7.7 | 6.2 | 3.9 |
| Glycerol | 30 | | | |
| 1,3-dioxane | 10 | | | |
| Ethanol | 10 | | | |
| Water | 50 | | | |
| No. 33 | | 6.2 | 5.0 | 3.4 |
| Glycerol | 30 | | | |
| 1,3-dioxolane | 10 | | | |
| NaNO₃ | 10 | | | |
| Water | 50 | | | |
| No. 34 | | 7.2 | 6.5 | 4.4 |
| PG¹ | 30 | | | |
| PGMEA⁴ | 20 | | | |
| Water | 50 | | | |
| No. 35 | | 5.8 | 4.6 | 3.2 |
| PG¹ | 20 | | | |
| PGMEA⁴ | 20 | | | |
| Ethylene carbonate | 10 | | | |
| Water | 50 | | | |

TABLE I-continued

| Composition | Wt. % | Viscosity (cP) 5° C. | 10° C. | 20° C. |
|---|---|---|---|---|
| No. 36 | | 6.2 | 4.9 | 3.4 |
| PG[1] | 20 | | | |
| PGMEA[4] | 20 | | | |
| Propylene carbonate | 10 | | | |
| Water | 50 | | | |
| No. 37 | | 5.5 | 4.5 | 3.2 |
| PG[1] | 20 | | | |
| PGMEA[4] | 20 | | | |
| 1,3-dioxolane | 10 | | | |
| Water | 50 | | | |
| No. 38 | | 6.2 | 5.6 | 3.8 |
| PG[1] | 20 | | | |
| PGMEA[4] | 20 | | | |
| Glycerol formal | 10 | | | |
| Water | 50 | | | |
| No. 39 | | 7.0 | 5.8 | 4.0 |
| PG[1] | 20 | | | |
| PGMEA[4] | 20 | | | |
| Ethanol | 10 | | | |
| Water | 50 | | | |
| No. 40 | | 7.0 | 5.7 | 3.8 |
| PG[1] | 20 | | | |
| PGMEA[4] | 20 | | | |
| 1,2-dimethoxy propane | 10 | | | |
| Water | 50 | | | |
| No. 41 | | 6.4 | 4.8 | 3.6 |
| PG[1] | 20 | | | |
| PGMEA[4] | 20 | | | |
| N,N-dimethylformamide | 10 | | | |
| Water | 50 | | | |
| No. 42 | | 6.6 | 5.4 | 3.2 |
| PG[1] | 8 | | | |
| Propylene glycol acetate | 30 | | | |
| Propylene glycol diacetate | 12 | | | |

[1]PG = propylene glycol
[2]TEG-diemthyl ether = triethylene glycol dimethyl ether
[3]TEG-monomethyl ether = triethylene glycol monoethyl ether
[4]PGMEA = propylene glycol methyl ether acetate The information in the above table shows that the compositions have acceptable viscosities.

EXAMPLE 2

Composition number 30 from Table I containing 30% propylene glycol, 10% 1,3-dioxane and 10% $KNO_2$ is cooled to obtain its freezing point. A slush of solid and liquid forms at −16° F.

EXAMPLE 3

A solution is prepared which has the following composition by weight: 30% propylene glycol, 10% 1,3-dioxolane, 10% methanol, 1.0% $K_2HPO_4$, 0.1% $Na_2B_4O_7$, 0.1% sodium tolyltriazole, and 48.8% water. The solution has a pH of 8.84 and a freezing point of −22° F.

EXAMPLE 4

A solution is prepared which has the following composition: 30% propylene glycol, 10% 1,3-dioxolane, 10% $KNO_2$, 1.0% $K_2HPO_4$, 0.1% $Na_2B_4O_7$, 0.1% sodium tolyltriazole, and 48.8% water. The solution has a pH of 8.95 and a freezing point of −20° F.

What is claimed is:

1. A heat transfer fluid consisting essentially of
   (1) from 30 to 60 weight percent of a glycol component selected from the group consisting of propylene glycol, glycerol, 1,3-butanediol, diethylene glycol and triethylene glycol;
   (2) from 10 to 60 weight percent of a second component selected from the group consisting of 1,3-dixolane, 2,2-dimethyl-1,3-dioxolane, glycerol formal, and solketal and 1,3-dioxanes;
   (3) from 0 to 50 weight percent of a third component selected form the group consisting of urea, imidazole and alkali metal salts;
   (4) from 0 to 30 weight percent of a $C_{1-3}$ alcohol; and
   (5) optionally, corrosion inhibitors in addition to any urea or alkali metal salts which may be present as part of the third component.

2. The fluid of claim 1 wherein the glycol component is propylene glycol.

3. The fluid of claim 1 wherein the third component is present and is urea.

4. The fluid of claim 1 consisting essentially of propylene glycol, 1,3-dioxane; and an alkali metal salt.

5. The fluid of claim 1 consisting essentially of propylene glycol, 1,3-dioxolane; methanol; $K_2HPO_4$; $Na_2B_4O_7$; and sodium tolytriazole.

6. The fluid of claim 1 consisting essentially of propylene glycol, 1,3-dioxolane; sodium nitrate; $K_2HPO_4$; $Na_2B_4O_7$; and sodium tolytriazole.

7. The fluid of claim 1 wherein the second component is 4-methyl-1,3-dioxane.

* * * * *

UNITED STATES PATENT AND TRADEMARK OFFICE
CERTIFICATE OF CORRECTION

PATENT NO. : 5,484,547
DATED : January 16, 1996
INVENTOR(S) : Abel Mendoza

It is certified that error appears in the above-indentified patent and that said Letters Patent is hereby corrected as shown below:

In Claim 1, column 6, line 22, "1,3-dixolane" should read -- 1,3-dioxolane --.

Signed and Sealed this

Thirteenth Day of January, 1998

Attest:

BRUCE LEHMAN

*Attesting Officer*  *Commissioner of Patents and Trademarks*